G. HONOLD.
ELECTRIC GENERATOR.
APPLICATION FILED JUNE 16, 1905.
900,542.
Patented Oct. 6, 1908.
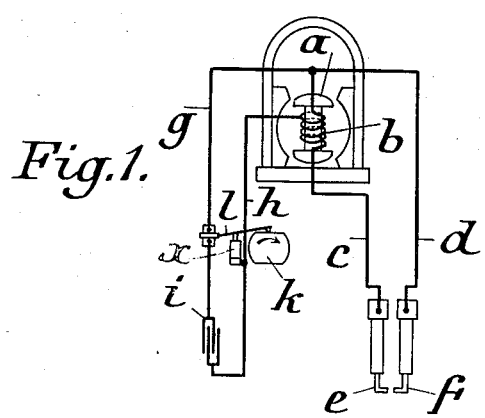
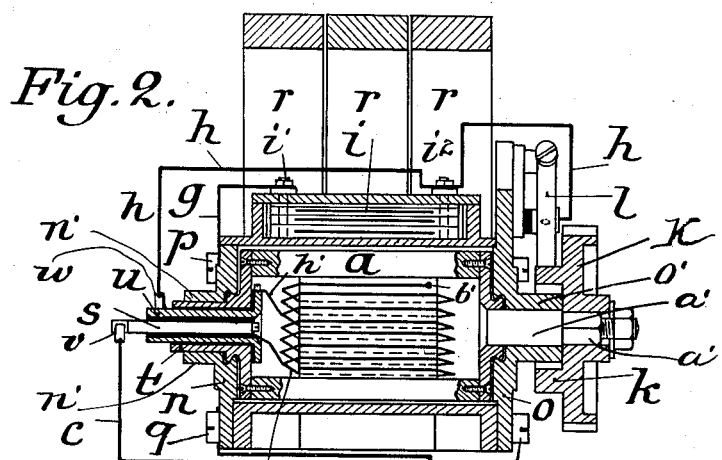
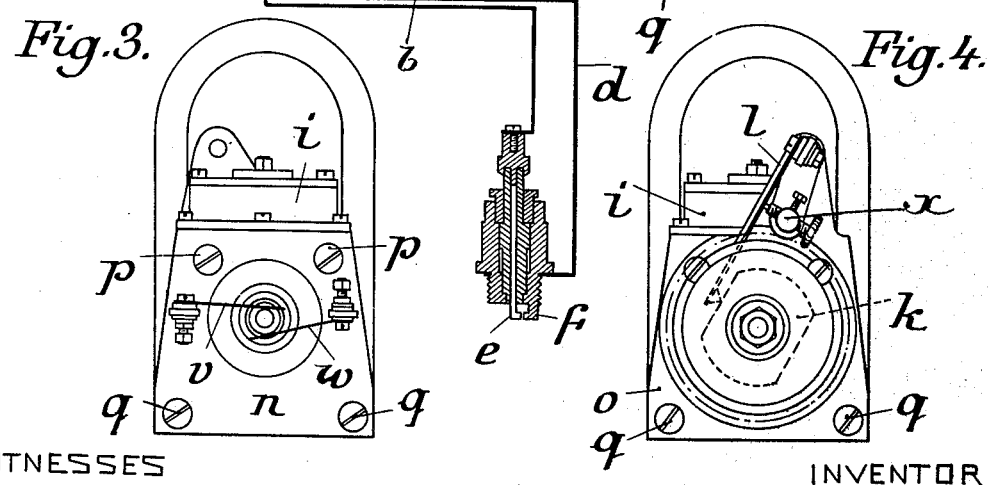
WITNESSES
INVENTOR
Gottlob Honold
by Georgii & Massie
ATTORNEYS

ID COPY

UNITED STATES PATENT OFFICE.

GOTTLOB HONOLD, OF STUTTGART, GERMANY.

ELECTRIC GENERATOR.

No. 900,542.   Specification of Letters Patent.   Patented Oct. 6, 1908.

Original application filed April 30, 1902, Serial No. 105,380. Divided and this application filed June 16, 1905. Serial No. 265,573.

*To all whom it may concern:*

Be it known that I, GOTTLOB HONOLD, engineer, a subject of the German Emperor, residing at Stuttgart, 11 Hoppenlaustrasse, Germany, have invented certain new and useful Improvements in Electric Generators, (being a division of my application Serial No. 105,380, filed April 30, 1902;) and I do hereby declare the following to be a full, clear, and exact description of the invention, such as will enable others skilled in the art to which it appertains to make and use the same.

My invention relates to improvements in electric generators, and in particular to a magneto-electric generator suitable for use with ignition devices for internal combustion engines.

The object of my invention is to obtain a high voltage at the ignition electrodes, with a simple and durable apparatus, and at the same time to provide means whereby this voltage is sustained for an appreciable period of time.

With this object in view my invention consists in the features, details of construction and combination of parts which will first be described in connection with the accompanying drawings and then particularly pointed out in the claims.

In the drawings Figure 1 is a diagrammatic view of a complete apparatus embodying my invention; Fig. 2 a longitudinal section of a generator embodying my invention in its preferred form, and Figs. 3 and 4 end views of the same.

Referring to Fig. 1 of the drawings, $a$ is a revoluble armature provided with a plurality of armature turns forming a winding $b$ whose terminals are connected in any suitable way to the electrodes $e$, $f$, of the ignition device, as, for example, by means of the conductors $c$ and $d$. In addition to this, a shunt circuit is provided for the armature, as, for example, by connecting one terminal of the winding to a conductor $g$, while another conductor $h$, is united to the armature winding $b$ at a suitable point, intermediate its two terminals.

Means is provided for closing the shunt circuit formed by the conductors $g$ and $h$, which closing means is operated intermittently to open and close the shunt circuit. In the present example, this means consists of a spring contact-arm $l$ arranged to engage a contact-post $x$, whereby the shunt circuit is closed; the contact-arm being pressed away from contact with the post by any suitable means, for example, by a cam $k$ rotated in any desired manner. In my preferred construction, a condenser $i$ is connected in parallel with the contact-arm and post.

In the specific embodiment of the invention shown in Figs. 2, 3 and 4, $a$ is an armature revolubly mounted between two end plates $n$ and $o$ which are attached to field magnets $r$ in any desired way, as for example, by screws $p$ and $q$ (see Figs. 2 and 3).

The armature $a$ is provided at one end with a trunnion $a'$ which is revolubly mounted in a bearing $o'$ carried by the end plate $o$, the trunnion $a'$ projecting beyond the said bearing $o'$ and being squared to receive a gear-wheel $K$ having an inward projecting flange $k$, Fig. 2, which is cam-shaped to serve as a cam for actuating the circuit interrupter, as will be further explained hereinafter. The other end of the armature $a$ is supported upon a trunnion $t$ which is hollow and revolubly mounted in a bearing $n'$ carried by the end plate $n$. Through this hollow trunnion $t$ there extends a sleeve $u$ and within this sleeve is an axle $s$, which projects beyond the sleeve $u$ as will be clear from Fig. 2. The sleeve $u$ is insulated from the hollow trunnion $t$ and from the axle $s$ by suitable insulating material as indicated by the black lines in Fig. 2, and as will be fully understood by those skilled in the art. The axle $s$, the sleeve $u$ and the hollow trunnion $t$ rotate together with the armature.

The armature $a$ has a suitable winding, consisting of a plurality of turns, one end of said winding being electrically connected to the axle $s$, as shown in Fig. 2, while the other end is grounded on the armature core, as indicated at $b'$, Fig. 2. Furthermore, the armature winding is also tapped at a suitable point and connected with the sleeve $u$, as for example, by the wire $h'$, Fig. 2.

One electrode $e$ of the ignition device is in electrical connection with the axle $s$ through a conductor $c$ attached to a brush $v$, Fig. 3, which bears on the said axle $s$ and thus maintains an electrical connection between the conductor $c$ and the axle $s$ while still permitting the latter and its attached armature to rotate. The other electrode $f$ is in electrical communication with the base of the machine through a conductor $d$ suitably attached to the base as by means of one of the screws $q$, Fig. 2. In this way an electrical communication is made between the grounded terminal $b'$ of the armature winding $b$ and the electrode $f$, by way of the armature itself, the trunnion $a'$, the bearing $o'$, end plate $o$ and the machine base.

At the top of the machine is mounted a condenser $i$, whose terminals are indicated at $i'$, and $i^2$, Fig. 2.

Upon the cam device $k$ rests one end of a yielding contact spring $l$ whose other end is fixed to the end plate $o$ of the machine and is in electrical communication therewith. The contact spring $l$ is arranged to make and break contact with a contact post $x$ carried by but insulated from the end plate $o$. This part $x$ is in electrical communication with the sleeve $u$ through a conductor $h$ and a brush $w$ (Fig. 3) which bears against the under side of the said sleeve $u$.

The conductor $h$ is also connected to one terminal $i^2$ of the condenser $i$ as shown in Fig. 2, the other terminal $i'$ of the condenser being grounded on the machine base, as for example, by means of a conductor $g$, leading from the terminal $i'$ to one of the screws $p$ of the end plate $n$.

The gear wheel K is driven in any suitable manner, as for example, by a gear wheel on the engine, (not shown). When the gear wheel rotates, the armature is rotated and the cam $k$ causes the contact spring $l$ to rise and fall thus making and breaking contact with the post $x$.

When the contact is made between the post $x$ and spring $l$ a shunt circuit is closed from the grounded terminal $b'$ of the armature winding, through some of the turns of such winding to conductor $h'$ thence over the sleeve $u$, brush $w$ and conductor $h$ to post $x$ and spring $l$, which being grounded on the machine itself is in electrical connection with the grounded terminal $b'$ of the armature winding.

When the armature is set in rotation, electro-motive forces are induced in the winding by the magnetic field. If now some of the turns are shunt circuited, by the contact of the contact-arm $l$, with the post $x$, the current flowing in the shunt circuited winding generates lines of magnetic force in the armature which neutralize the existing magnetic field, that is to say, they force back the existing lines of force.

As soon as the shunt circuit is opened or broken, the counter-action of the lines of force generated in the armature ceases. Owing to the changes thus arising instantaneously in the number of lines of magnetic force, the potential rises so high in the armature winding that a small voltaic arc forms between the electrodes, $e$, $f$, of the ignition device, and, moreover, this arc is sustained for an appreciable period of time by the continued rotation of the armature, which is not the case with an ordinary induction coil. As a result, the ignition of the explosive mixture takes place in a very intense manner.

The condenser $i$, which is in parallel with the circuit interrupter serves to break the circuit as quickly as possible.

Having thus fully described my invention, what I claim is:—

1. The combination, with a generator having a plurality of generating turns, of spark-electrodes arranged to be energized from the generator-turns, means for shunt circuiting a portion of said generator-turns, and means for opening said shunt-circuit, whereby a spark is produced between the electrodes.

2. The combination, with a generator having a plurality of generating turns, of spark-electrodes arranged to be energized from the generator-turns, a shunt circuit arranged to shunt circuit a portion of said generator turns, a condenser included in said shunt-circuit, and means for opening said shunt circuit.

3. The combination, with a generator having a plurality of armature-turns, of spark-electrodes out of contact with each other, a circuit including said electrodes and arranged to be energized by the armature-turns of the generator, a shunt-circuit in which some of said armature turns are included, and means for opening said shunt-circuit.

4. The combination, with a generator having a plurality of armature-turns, of spark-electrodes out of contact with each other, a circuit including said electrodes and arranged to be energized by the armature-turns of the generator, a shunt-circuit in which some of said armature-turns are included, a condenser in said shunt-circuit, and means for opening said shunt-circuit.

5. The combination, with a generator having a plurality of armature-turns, of spark-electrodes out of contact with each other, a circuit including said electrodes and arranged to be energized by the armature-turns of the generator, a shunt-circuit in which some of said armature-turns are included, and means for opening and closing said shunt-circuit.

6. The combination, with a generator having armature-turns, of spark electrodes arranged to be energized by said armature-turns, a shunt-circuit connected to two different points of the armature-turns, and means for intermittently opening and closing said shunt-circuit.

7. The combination, with a generator having armature-turns, of spark-electrodes arranged to be energized by said turns, a shunt-circuit connected to two different points of the armature-turns, an interrupter included in the shunt-circuit, and a condenser connected to the shunt-circuit in parallel with the interrupter.

8. The combination, with a generator having armature-turns, of spark-electrodes arranged to be energized by said turns, a shunt-circuit connected to two different points of the armature-turns, and an interrupter included in the shunt-circuit and operated by the rotation of the armature.

9. The combination, with a generator having a plurality of armature-turns, an igniting circuit connected to the terminals of said turns, and spark-electrodes included in the igniting circuit, of a shunt-circuit including a part only of said armature turns, and means for closing and opening the said shunt-circuit.

10. The combination, with a generator having a plurality of armature-turns, an igniting circuit connected to the ends of said turns, and spark-electrodes included in the igniting circuit, of a shunt-circuit connected to one end of said turns and to an intermediate point of the same, and means for closing and opening said shunt-circuit.

In testimony whereof I hereunto affix my signature in the presence of two witnesses.

GOTTLOB HONOLD.

Witnesses:
ROBERT BOSCH,
ERNST ENTENMAN.